United States Patent

Semmens

[11] 4,098,690
[45] Jul. 4, 1978

[54] WATER PURIFICATION PROCESS

[75] Inventor: Michael J. Semmens, Champaign, Ill.

[73] Assignee: The University of Illinois Foundation, Urbana, Ill.

[21] Appl. No.: 671,328

[22] Filed: Mar. 29, 1976

[51] Int. Cl.$^2$ ............................ C02C 5/08; C02C 5/10
[52] U.S. Cl. .................................. 210/18; 210/30 R; 210/38 R; 210/DIG. 28
[58] Field of Search ............... 210/11, 30 R, 34, 38 R, 210/DIG. 28, 2, 15, 17, 18, 32, 63 R

[56] References Cited
U.S. PATENT DOCUMENTS

| | | | |
|---|---|---|---|
| 3,723,308 | 3/1973 | Breck | 210/38 R |
| 3,846,289 | 11/1974 | Jeris et al. | 210/DIG. 28 |
| 3,929,600 | 12/1975 | Hiasa et al. | 210/34 |

*Primary Examiner*—Charles N. Hart
*Assistant Examiner*—Ivars Cintins
*Attorney, Agent, or Firm*—Barry Kramer

[57] ABSTRACT

A process for treating wastewaters to reduce the ammonia content thereof comprising the steps of:

a. contacting wastewater, having a dissolved ammonia content, with an ion exchanger having an affinity for ammonium ions whereby ammonium ions become sorbed onto said ion exchanger;

b. separating said ion exchanger containing sorbed ammonium ions from the wastewater and then regenerating said ion exchanger and converting the ammonium ions thereon to nitrate ions by treating the ion exchanger with a concentrated salt solution and a culture of nitrifying bacteria whereby ions from the salt solution become absorbed onto the ion exchanger while ammonium ions on the ion exchanger are displaced into solution and oxidized by the nitrifying bacteria to nitrate ions; and, c. recycling the regenerated ion exchanger for further contact with wastewater.

8 Claims, 3 Drawing Figures

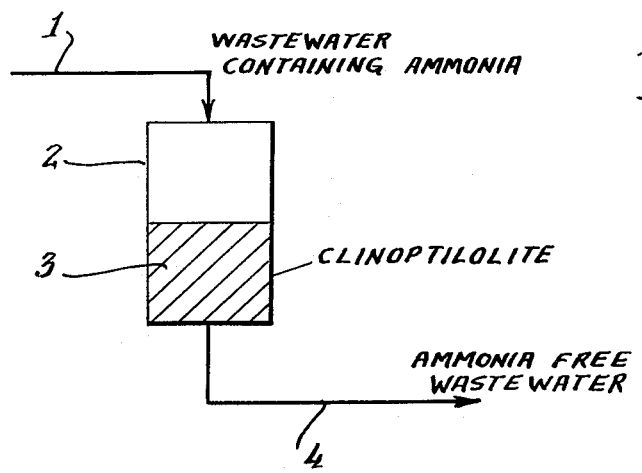
Fig. 1. SERVICE RUN
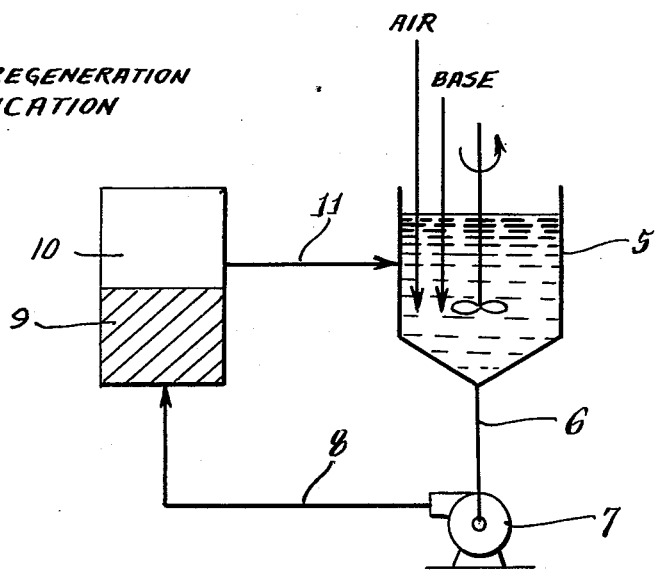
Fig. 2. SIMULTANEOUS REGENERATION AND NITRIFICATION
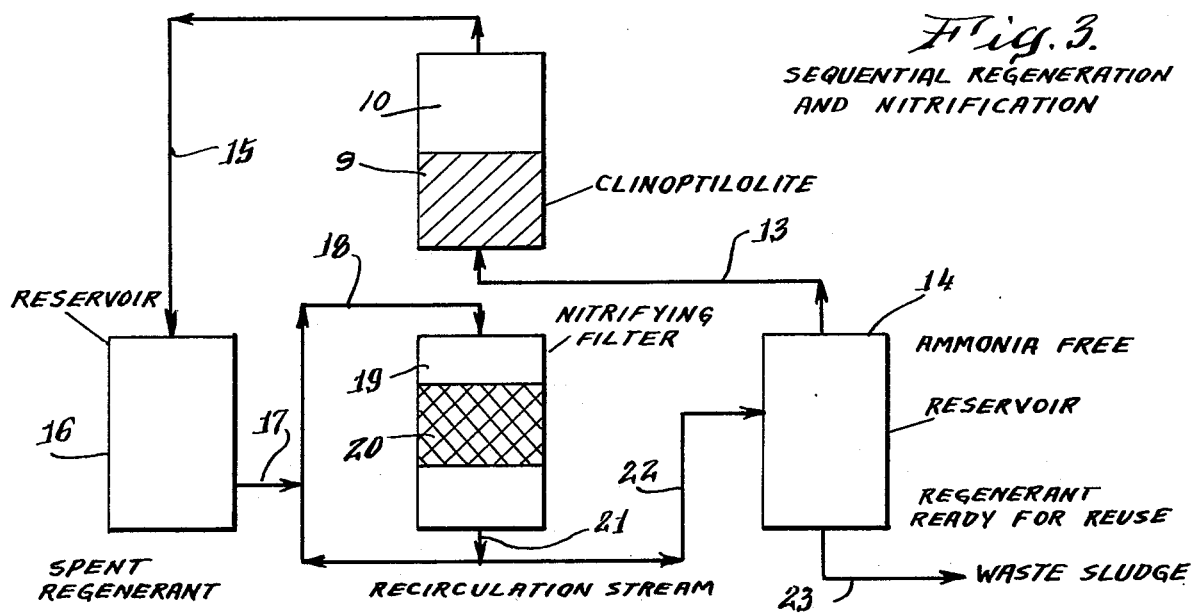
Fig. 3. SEQUENTIAL REGENERATION AND NITRIFICATION

WATER PURIFICATION PROCESS

The present invention relates to a means of overcoming the problem of ammonia contamination of water resources.

Still more particularly, the process of the present invention relates to the removal of ammonia from water by ion exchange and the regeneration of the ammonia containing ion exchange material by use of nitrifying bacteria.

Ammonia-nitrogen enters lakes, streams, and other natural water systems from various municipal, agricultural and industrial wastewater sources. Typical concentration ranges for ammonia in these wastewaters are up to 200 milligrams per liter for agricultural wastewaters, and up to 30 milligrams per liter from municipal wastewaters. Industrial wastewaters such as, for example, those issuing from coal gasification plants contain ammonia perhaps in excess of 100 milligrams per liter, even after stripping operations.

Nitrogen in the ammonia form can have a particularly deleterious impact on the environment, especially the aquatic environment. Ammonia-nitrogen, as compared to other nitrogen compounds such as nitrate and also free nitrogen, has been identified as the most important algal growth nutrient form. Algal growth rates have been traditionally used as an index of the extent of eutrophication in a water body. Perhaps, more importantly, ammonia, a reduced form of nitrogen can exert a significant oxygen demand on receiving waters through subsequent biological oxidation. The nitrifying organisms which oxidize ammonia into nitrate and nitrite are ubiquitous in nature, having been enumerated in lakes, streams and ponds, as well as underlying muds and sediments. Since these organisms are present in sufficient quantities in aquatic environments, the oxygen demand created by biologically oxidizing the ammonia emanating from various wastewater sources, has a profound effect on the dissolved oxygen level of the receiving waters. Many studies have been directed toward quantifying these nitrification effects, and have concluded that they cannot be neglected in estimating the oxygen resources of a water system.

While eutrophication is most important in standing bodies of water, ammonia toxicity may be a more severe problem than eutrophication in flowing streams and rivers.

Ammonia and ammonium compounds can also be toxic to fish and other aquatic life in concentration levels as low as 0.2 to 2.0 milligrams per liter depending upon the pH and temperature. Ammonia can also combine with other compounds found in wastewaters such as chlorine to form chloramines which can be toxic to fish at very low levels, i.e., 0.06 to 0.1 milligrams per liter.

Finally, ammonia can have a deleterious effect on materials with which it comes into contact. For example, in certain instances, ammonia can cause accelerated corrosion of metals and materials used in construction.

There are a number of physical-chemical and biological processes available for the removal of ammonia from wastewaters. Electrodialysis, breakpoint chlorination, algal and bacterial assimilation have been generally considered the less attractive techniques due to their poor efficiency, high costs or operational problems.

The three most widely used methods for removing ammonia from wastewater on a cost and performance basis are air stripping, ion exchange and biological nitrification/denitrification. These processes have been studied extensively and their design, operation and costs have been reported in numerous places.

The air stripping process has been effectively optimized to the point where it is economically attractive. However, the problems associated with carbonate scaling, biological activity in the stripping towers, poor cold weather operation and possible air pollution have limited its use in removing ammonia from wastewaters. Certain investigators have suggested that because of the above problems, air stripping is not a practical method of removing ammonia from wastewaters.

With regard to the biological nitrification/denitrification method, one investigator, Reeves, T. G. "Nitrogen Removal: A Literature Review," *Journal of Water Pollution Control Fed.*, 44, 10, 1895 (1972) suggested that the biological system is the most practical method available. This process however has its own limitations. Proper oxygen transfer, pH control and chemical addition for ammonia and biochemical oxygen demand removal under seasonal conditions (especially cold weather operations) must be provided. A three stage system may also be quite costly, and many toxic components can severely inhibit the nitrification process.

Reeves supra also stated that the ion exchange process may be feasible in small municipal treatment plants, but operational difficulties of resin fouling by organic compounds, plugging of the ion exchange bed, and spent regenerant brine disposal make this process difficult to use in larger plants.

Koon, J. H. and W. H. Kaufman, "Optimization of Ammonia Removal by Ion Exchange Using Clinoptilolite," Final Report to Water Quality Office, U.S.E.P.A., September 1971, compared the costs of the three major methods available for ammonia removal from domestic wastewater. They found that the costs were comparable, between 8 and 12 cents per thousand gallons of water treated. A significant part of their finding was that approximately 50 to 60% of the total ion exchange process costs were due to chemical regeneration of the zeolite ion exchanger. Hence, there is a strong cost incentive to look at improving the technique for regenerating the ion exchange material. If appreciable improvements can be made, the cost of the overall ion exchange process using zeolite would be reduced perhaps to the degree where it may be the most attractive process on an economic basis.

Koon and Kaufman supra used a regeneration scheme in which the zeolite is treated with a caustic brine (sodium hydroxide and sodium chloride). The regenerant was subsequently stripped of ammonia and recycled with makeup caustic brine. Although this regeneration technique places the ion exchange method on a competitive basis with other ammonia removal processes, it still has chemical regenerant requirements and the problems associated with the air stripping column operation, since the ammonia is removed from the regenerant by air stripping. Difficulties also arise in this method because the use of high pH brines increase the amount of chemical attrition of the zeolite.

Research has been conducted, by workers at the University of North Carolina, directed to the biological regeneration of zeolites. Thus, Sims et al reported, in the paper entitled "Applications of Clinoptilolite in Biological Nitrification System," 46th Annual Conference, WPCF, October 1973, addition of clinoptilolite in a ground form to an activated sludge unit. The clinoptilolite was continually recirculated with the activated sludge (the sludge containing nitrifying bacteria). It was suggested that the zeolite so added would continually remove ammonia from wastewater and then be regenerated by the nitrifying bacteria that accumulate on the zeolite surface. However, this study demonstrated that little benefit is derived from the zeolite once it has removed ammonia from the wastewater by ion exchange.

Thus, until the present invention, the only successful technique for regeneration of ammonia containing ion exchange material was the chemical regeneration method requiring large amounts of expensive chemicals which materially increase the cost of ammonia removal.

In the light of the importance of removing ammonia from wastewater, it is an object of the present invention to provide a technique which accomplishes this end in a practical and economically feasible manner.

It is a further object of the present invention to provide a method which takes full advantage of ion exchange removal of ammonia and the nitrifying capability of certain bacteria to effectively remove ammonia from water and, thereafter, regenerate the ion exchange material without the need for large amounts of chemical regenerating materials.

Other objects of this invention will become apparent from the ensuing description.

In the process of the present invention, wastewater containing ammonia is first passed through an ion exchange unit containing an ion exchanger which has a preferential affinity for ammonium ions as compared with other ions such as sodium, calcium and magnesium commonly occurring in wastewater. When an undesirable ammonium ion concentration breaks through the bed of ion exchanger, the spent ion exchanger, is taken out of service for regeneration. Regeneration may be accomplished in either of two ways: firstly, the ion exchanger may be contacted with a brine containing a high concentration of nitrifying bacteria in which technique, exchange and nitrification occur simultaneously; or secondly, the ion exchanger may be exposed to the brine only, and the resultant ammonia containing brine is then nitrified in a separate unit before being recycled. Both process schemes rely on the same principles.

In the first of the techniques, the bed of spent ion exchanger, after removal from the stream of ammonia-containing wastewater, is contacted with a large volume of concentrated salt solution containing nitrifying bacteria. Contact is maintained until the ammonium ions in the ion exchanger are substantially displaced by sodium ions from the brine solution, and the displaced ammonium ions are converted to nitrate ions. After ion exchange and nitrification are complete, the regenerated ion exchanger is rinsed with product water and replaced in service for further ammonia removal.

In the second technique, the ammonia containing ion exchange material is first contacted with brine to displace ammonium ions in the ion exchanger with sodium ions from the brine solution. The regenerated ion exchanger is then returned to service for further ammonia removal, while the ammonia containing brine solution is fed into a nitrification reactor for conversion of ammonium ions to nitrate ions.

The nitrate brine, accumulated in accordance with the above-described biological regeneration techniques, may be denitrified and used to advantage in a number of possible ways. For example, it may be fed to the aeration tank of an activated sludge tank and used to reduce the air requirements, or it may be applied to the sewers at a distance from the sewage treatment plant such that it may provide a significant degree of pretreatment and an economical solution to odor problems arising from anaerobic conditions. The brine may also be denitrified using a carbon source such as methanol. Although this is more costly, it would mean that there would be no brine waste since the water could be recirculated. In addition, the alkalinity produced during denitrification could reduce the requirement of sodium carbonate for pH control during regeneration, if the two processes were conducted simultaneously and controlled in an appropriate fashion.

The ion exchange materials, which can be used in accordance with the present invention, may be either synthetic or natural materials which have a preference for ammonium ions as compared with calcium, sodium or magnesium ions commonly found in wastewaters. It is advantageous to use natural ion exchangers since these materials tend to be less prone to fouling by organic materials present in the wastewaters. The most preferred material is a natural zeolite called clinoptilolite which is found in large quantities in various parts of the country. The clinoptilolite is preferably employed in a ground and sieved form using fractions between U.S. Standard mesh numbers 18 and 50.

After the ion exchanger has been on stream in contact with ammonia contacting wastewater, its ability to continue to sorb ammonia ions diminishes to the point where the wastewater passing through the ion exchanger has an undesirably high ammonia content. At this point, the ion exchanger is removed from service and regenerated, by either of the techniques previously described.

In the first process, in which a slurry of nitrifying bacteria in salt solution is contacted with the clinoptilolite, the mechanism of regeneration is as follows. When the salt is contacted with the ion exchanger a small amount of ammonium will be displaced according to equation 1.

$$Z \cdot NH_4^+ + Na^+ Cl^- \rightarrow ZNa^+ + NH_4^+ + Cl^- \quad (1)$$

The ion exchange equilibrium between ammonium and sodium ions for Hector clinoptilolite is known from batch isotherm studies to be 4.5. This value was calculated when the ionic fraction of ammonium ions in solution was 0.5 and higher values were indicated at lower ionic fractions. For the purposes of illustration, however, it is assumed this value is applicable to this analysis. The ammonium ion concentration in solution may be calculated using equation 2 if equilibrium in a binary system is assumed.

$$[NH_4^+] = \frac{\bar{X}_{NH_4^+} \cdot [Na^+]}{4.5 (1 - \bar{X}_{NH_4^+})} \quad (2)$$

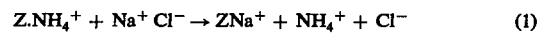

The square brackets represent concentrations in solution expressed as meq/l and the X values represent the ionic fraction of species in the zeolite phase.

It is clear from this equation that the amount of ammonium dispersed from the zeolite is influenced both by the amount of ammonium on the zeolite and the salt concentration in solution. Thus, even if only a very small salt concentration is present, when there is an appreciable amount of ammonium on the clinoptilolite, a concentration of free ammonium ions will be found. For example, if a clinoptilolite sample is put into a natural water with a salt concentration of $10^{-3}M$ and $X_{NH_4} = 0.5$, then $[NH_4\text{-}N] \approx 0.2$ meq/l. If the salt concentration was $10^{-2}M$ then a concentration of approximately 2 meq/l of ammonium ions would be observed.

As the ammonium ions are liberated they are oxidized by the nitrifying bacteria. The reaction stoichiometry is represented by equations 3-5. Nitrite Production (Nitrosomonas)

$$NH_4^+ + Cl^- + (3/2)O_2 \rightarrow NO_2^- + Cl^- + 2H^+ + H_2O \qquad (3)$$

Nitrate Production (Nitrobacter)

$$NO_2^- + Cl^- + 2H^+ + \tfrac{1}{2}O_2 \rightarrow NO_3^- + Cl^- + 2H^+ + H_2O \qquad (4)$$

Overall Nitrification $$NH_4^+ + Cl^- + 2O_2 \rightarrow NO_3^- + Cl^- + 2H^+ + H_2O \qquad (5)$$

The hydrogen ions produced during the nitrification process are neutralized by the addition of sodium carbonate. Equation (5) may be rewritten to include the concurrent neutralization of hydrogen ions and the overall equation is present in equation 6.

$$NH_4^+ + Cl^- + 2O_2 + Na_2CO_3 \rightarrow NO_3^- + Cl^- + 2Na^+ + 2H_2O + CO_2 \qquad (6)$$

Combining equations 1 and 6 we obtain equation 7 which describes the overall regeneration process.

$$Z.NH_4^+ + 2O_2 + Na_2CO_3 \rightarrow Z.Na^+ + NO_3^- + Na^+ + 2H_2O + CO_2 \qquad (7)$$

This equation indicates that, for each equivalent of ammonia oxidized, two equivalents of sodium carbonate are required for pH control. One half of the sodium ions so added replace the ammonium ions on the zeolite, and the other half remain in solution as sodium nitrate. The regeneration process therefore results in the build-up of sodium nitrate in solution.

The build-up of salt is desirable in that it may improve the rate of regeneration in the subsequent regeneration cycle. However, too high a brine concentration is undesirable because it can cause inhibition of the nitrifying bacteria. The salt concentration should be maintained in the 200-500 meq/l range for optimum performance.

When the brine is nitrified subsequent to regeneration, equations 1-7 still govern the process stoichiometry. The only difference is that the brine is nitrified in a separate unit and the two steps are therefore physically separated. Naturally, the salt concentration would still have to be maintained in the 200-500 meq/l range in order to prevent inhibition of the nitrifying bacteria.

The nitrifying bacteria which are most conveniently employed are the ubiquitous Nitrosomonas and Nitrobacter species. Cultures of such bacteria can be obtained from activated sludge resulting from the treatment of domestic sewage. A source of such cultures can be obtained by culturing the bacteria in an aeration tank to which ammonia and other nutrients are added as is well known in the art.

As is also well known in the art, certain conditions must prevail during nitrification in order for the bacteria to thrive. For example, pH should be maintained in the range of 7 to 9, preferably 7.8 to 8.5. Sodium carbonate or sodium hydroxide should be added for the control of pH. The nitrification medium should contain nutrients such as potassium, calcium, magnesium, phosphorus and certain trace metals. It is also important that the level of aeration during nitrification be sufficiently high, or another alternate supply of oxygen be provided, to enable the dissolved oxygen concentration in the nitrification medium to be maintained at a level of at least 3 milligrams per liter and preferably 6 milligrams per liter. If the DO falls below this range the rate of nitrification is considerably reduced. Data collected by the inventor indicate that the maximum rate of nitrification is maintained into a dissolved oxygen concentration of 6 mg/l or more. Below 6 mg/l the nitrification rate falls to only 33% of the maximum rate at 2 mg/l of DO.

The regenerant solution, after nitrification, contains principally a nitrate salt (sodium nitrate, if sodium carbonate or NaOH is added for the maintenance of a neutral pH) and nitrifying bacteria. When ammonium is oxidized with high concentrations of nitrifying sludge, the oxygen uptake rate is very high. Conventional aeration devices may not be sufficient to maintain dissolved oxygen levels of 3-6 mg/l. If pure oxygen is used, sodium carbonate must be employed as a base for pH control. This is because the nitrifying bacteria require inorganic carbon (as in carbonate) for synthesis of cell tissue and growth. If air is used, sodium hydroxide may be used as an alternative base since in this case inorganic carbon is provided by the dissolution of atmospheric carbon dioxide. Other base alternatives such as $CaCO_3$ and $Ca(OH)_2$ would replace sodium carbonate and sodium hydroxide but the ion exchanger does not perform as well if regenerated with calcium salts. Regeneration would also take longer.

The nitrate may be disposed of in a number of ways when it is in such a concentrated solution (0.2-0.5M). There are a number of possibilities for denitrification, such as in sludge digestion or in sewers before primary treatment where the nitrate may provide an economical solution for the control of hydrogen sulfide odors, for example. Nitrate brine may also be denitrified using waste sludge and/or methanol as a carbon source and the denitrified brine recycled for reuse.

The invention will now be described in connection with the accompanying drawings in which:

FIG. 1 is a schematic of an ion exchanger useful for removing ammonia from wastewaters;

FIG. 2 schematically illustrates one manner of practicing the present invention in which spent ion exchanger is regenerated by simultaneous elution and nitrification; and FIG. 3 schematically illustrates the operation of the present invention wherein the spent ion exchanger is regenerated and the regenerant is sequentially nitrified.

Turning now to the drawings, FIG. 1, an ion exchange unit 2 is provided with a bed of ion exchanger 3. Wastewater containing ammonia is fed to the ion exchanger through line 1 and ammonia free wastewater is withdrawn from the bottom of bed 3 through line 4. When the wastewater stream issuing from the line 4 shows a larger than desirable concentration of ammonium ions, the ion exchanger is taken out of service in order to permit the regeneration of the ion exchange material. Although not shown, the present invention contemplates a plurality of ion exchange units in parallel relation whereby as one ion exchange unit is taken out of service to permit regeneration, another is put into service in order to allow continuity in ammonia removal from the wastewater.

In FIG. 2, the spent ion exchanger is regenerated while ammonium ions in the regenerant solution are nitrified simultaneously. Unit 10 may be, and is preferably the same unit as ion exchanger unit 2 shown in FIG. 1. Though not shown, unit 10 may have provision for feeding wastewater containing ammonia at the top of the unit and removing ammonia free wastewater at the bottom of the unit as well as valving means to open and close wastewater entry and exit lines thereby enabling the unit to be used in one mode for ammonia removal, and in another mode for regeneration and nitrification.

A fluidized ion exchange bed 9 is treated with a slurry of nitrifying bacteria containing dissolved oxygen, nutrients and base material by feeding the slurry through line 8 into the ion exchange bed 9 and allowing the slurry to fluidize the bed for a sufficient time to permit displacement of the ammonium ions sorbed onto the ion exchange material with cations of the base material. The resultant regenerant solution is removed from unit 10 and fed through line 11 into an aeration tank 5. Aeration tank 5 has air feed means, base feed means coupled with a pH controller and agitating means capable of maintaining a favorable environment for rapid nitrification. Nitrification of the displaced ammonium ions takes place in aeration tank 5. The regenerant is drawn from the bottom of aeration tank 5 through line 6 and recirculated by means of pump 7 and line 8 into regeneration unit 10. Though not shown, valving means can be provided as noted above, to close lines 8 and 11 used in the regeneration and nitrification cycle, and open wastewater feed and removal lines used in the ammonia removal operation.

An alternative regeneration and nitrification technique is shown in FIG. 3 involving sequential regeneration of the spent ion exchanger and nitrification of the regenerant solution. As in FIG. 2, regeneration unit 10 contains a bed of spent ion exchange material 9. Likewise, as mentioned in connection with FIG. 2, the regeneration unit may be provided with piping and valving means to permit alternate use of unit 10 as an ion exchanger and regenerator. As shown, regenerant solution, containing cations such as sodium, capable of displacing ammonium from clinoptilolite, is fed through line 13 to the bottom of regenerator 10 having a bed of spent ion exchange material 9. The regenerant solution flows through the ion exchange bed and is removed at the top of regenerator 10 through line 15 and fed into reservoir 16. Spent regenerant is fed from reservoir 16 into recirculation stream 18 through line 17. Spent regenerant is recirculated through unit 19 containing the nitrifying filter 20. Nitrifying filter 20 is essentially a medium to which the nitrifying bacteria may attach and flourish (as is well known in the art). The pH is maintained at a pH of 7.8 and 8.5 and nutrients added as needed. The spent regenerant is recirculated through the nitrifying filter until essentially all the ammonium content is converted to nitrate ions.

The nitrification process is relatively rapid. For example, a 2.5 inch diameter column filled to a depth of 1.5 feet with spent clinoptilolite was repeatedly regenerated in less than 1.5 hours by 100 liters of nitrifying sludge.

The nitrification process is easily controlled in both cases by monitoring the ammonium concentration in solution. When a very low level of ammonium (e.g., 0.1 milligrams/N) is detected in the slurry containing 300 meq/l of sodium nitrate, nitrification is complete. The sodium nitrate containing regenerant is removed from nitrifying filter 19 through line 21 which is a part of recirculation stream 18 and conveyed through line 22 to reservoir 14 where it is stored until ready for reuse. Any waste sludge entrained with the regenerant in reservoir 14 can be periodically drawn off through line 23.

The process as outlined above is a combined physicochemical and biological treatment and as such it has a number of distinct advantages over other known techniques for ammonia removal. The following is a list of some of these advantages.

1. Since high pH conditions are not required for regenerating the clinoptilolite, no chemical attrition of the zeolite is encountered.

2. The conversion of ammonia to nitrate by the nitrifying organisms proceeds at a much faster rate than in conventional biological nitrification since both substrate and organism concentration are maintained at high levels.

3. The conditions for rapid nitrification are easily controlled in the closed system; for instance, even in very cold weather the temperature of the "nitrifying slurry" can be maintained at about 20° C. during regeneration for a very low cost as compared to the cost for maintaining this temperature in an ammonia air stripping system.

4. The use of a brine with a low salt concentration is possible since nitrifying bacteria will oxidize ammonia in solution at very low concentrations of ammonia. By comparison, air stripping is most effective when the ammonia content of the brine is high.

5. Toxic compounds such as phenols which ordinarily inhibit nitrifying organisms in conventional biological nitrification plants have been shown to have no effect on the organisms during regeneration in accordance with this invention since the ion exchange material is selective for ammonia and toxic organic compounds are not removed from the wastewater to any significant extent.

6. Toxic metals in secondary effluents are generally not present as free ions. Therefore, significant metal concentrations will not be removed by the ion exchanger. Experiments with complexed copper have shown that while a small amount is removed by the zeolite, no inhibition of the nitrifying sludge is observed.

7. The capital and operating costs for a plant operating in accordance with the present invention is significantly less than for conventional nitrification since the use of the ion exchanger to concentrate the ammonia prior to nitrification significantly reduces the volume of water to be treated by the nitrifying bacteria.

8. The biological treatment of the regenerant is a process with which plant operating personnel are familiar. Highly skilled operators are therefore not required.

In addition to the foregoing advantages, as noted above, the concentrated nitrate brine which is the product of the process of the present invention may be disposed of in a number of ways (because of its high concentration) which are not available for the end product of conventional regeneration techniques which produce a brine containing ammonia. Such optional disposal techniques include:

1. Denitrification such as in sludge digestion or in sewers before primary treatment provides an economical solution for the control of hydrogen sulfide odors, for example.

2. Denitrification of the nitrate brine using waste sludge or methanol as a carbon source and recycling of the resultant denitrified brine for reuse.

Though, the present invention has been described with reference to certain specific reagents, conditions and steps, it is to be understood that the present invention is not intended to be thus limited. For example, though the basic material which is employed for pH control is preferably sodium carbonate other materials such as lime may also be used. Similarly, though the drawings depict a batch-type operation, the invention is also intended to comprehend a continuous operation in which a series of ion exchange modules are served by the same regeneration system. Thus in practice, the ion exchangers would become exhausted at different times and the nitrifying sludge would be employed continuously for their regeneration. Similarly, other modifications will be obvious to those skilled in the art and these are intended to be included in the invention, the scope of which is defined by the appended claims.

What is claimed is:

1. A process for treating wastewaters to reduce the ammonia content thereof comprising the steps of:
    a. contacting wastewater, having a dissolved ammonia content, with an ion exchanger having an affinity for ammonium ions whereby ammonium ions become sorbed onto said ion exchanger;
    b. separating said ion exchanger containing sorbed ammonium ions from the wastewater and then regenerating said ion exchanger and converting the ammonium ions thereon to nitrate ions by treating the ion exchanger with a concentrated salt solution and a culture of nitrifying bacteria whereby ions from the salt solution become sorbed onto the ion exchanger while ammonium ions on the ion exchanger are displaced into solution and oxidized by the nitrifying bacteria to nitrate ions; said salt solution comprising a brine having a concentration of 200 to 500 milliequivalents of sodium nitrate per liter; and,
    c. recycling the regenerated ion exchanger for further contact with wastewater.

2. The process of claim 1 wherein the ion exchanger is clinoptilolite.

3. The process of claim 1 wherein the nitrification reaction is conducted at a pH of 7 to 9.

4. The process of claim 1 wherein nitrification is conducted in an aqueous medium having at least 3 milligrams per liter of dissolved oxygen.

5. A process for treating wastewaters to reduce the ammonia content thereof comprising the steps of:
    a. contacting wastewater, having a dissolved ammonia content, with an ion exchanger having an affinity for ammonium ions whereby ammonium ions become sorbed onto said ion exchanger;
    b. removing said ion exchanger containing sorbed ammonium ions from contact with the wastewater and then simultaneously regenerating said ion exchanger and converting said ammonium ions to nitrate ions by contacting said ion exchanger with a concentrated salt solution containing nitrifying bacteria, said salt solution comprising a brine having a concentration of 200 to 500 milliequivalents of sodium nitrate per liter, whereby the ammonium ions in the ion exchanger are replaced with ions from the salt solution and the displaced ammonium ions are oxidized by said nitrifying bacteria; and
    c. recycling the regenerated ion exchanger for further contact with wastewater.

6. The process of claim 5 wherein the ion exchanger is clinoptilolite.

7. The process of claim 5 wherein the nitrification reaction is conducted at a pH of 7 to 9.

8. The process of claim 5 wherein nitrification is conducted in an aqueous medium having at least 3 milligrams per liter of dissolved oxygen.

* * * * *